United States Patent
Yang et al.

(10) Patent No.: US 11,093,862 B2
(45) Date of Patent: Aug. 17, 2021

(54) LOCALITY AWARE DATA LOADING FOR MACHINE LEARNING

(71) Applicant: International Business Machines Corporation, Armonk, NY (US)

(72) Inventors: Chih-Chieh Yang, White Plains, NY (US); Guojing Cong, Ossining, NY (US); Bilge Acun, Menlo Park, CA (US); Alessandro Morari, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 16/360,225

(22) Filed: Mar. 21, 2019

(65) Prior Publication Data

US 2020/0302334 A1   Sep. 24, 2020

(51) Int. Cl.
*G06N 20/00* (2019.01)
*G06F 16/21* (2019.01)
*G06F 16/22* (2019.01)

(52) U.S. Cl.
CPC ............ *G06N 20/00* (2019.01); *G06F 16/211* (2019.01); *G06F 16/2228* (2019.01)

(58) Field of Classification Search
CPC .... G06N 20/00; G06F 16/211; G06F 16/2228
USPC .................................................... 707/741
See application file for complete search history.

(56) References Cited

U.S. PATENT DOCUMENTS

| | | | | |
|---|---|---|---|---|
| 8,949,569 B2* | 2/2015 | Benner | ................ | G06F 9/3824 711/203 |
| 9,633,315 B2 | 4/2017 | Chapelle et al. | | |
| 9,984,337 B2 | 5/2018 | Kadav et al. | | |
| 2013/0013863 A1* | 1/2013 | Cher | ................ | G06F 12/0848 711/122 |
| 2014/0337255 A1* | 11/2014 | Eads | ................ | G06N 5/02 706/12 |
| 2017/0220949 A1* | 8/2017 | Feng | ................ | G06N 20/00 |

FOREIGN PATENT DOCUMENTS

WO    2017/136802 A1    8/2017

OTHER PUBLICATIONS

Kennedy, Robert K. L., et al., "A parallel and distributed stochastic gradient descent implementation using commodity clusters", Journal of Big Data, vol. 6, Article 6, Feb. 14, 2019, pp. 1-23.*
Rasoori, Sandeep, et al., "Scalable Hardware Accelerator for Mini-Batch Gradient Descent", GLSVLSI '18, Session 7: Machine Learning and HW Accelerators, Chicago, IL, May 23-25, 2018, pp. 159-164.*
Lin, T., et al., "Don't Use Large Mini Batches Use Local SGD", arXiv:1808.07217v3, Oct. 21, 2018, 20 pages.

(Continued)

*Primary Examiner* — Robert Stevens
(74) *Attorney, Agent, or Firm* — Scully, Scott, Murphy & Presser, P.C.; Daniel P. Morris

(57) ABSTRACT

A data index sequence indexing a dataset is received. A location of a data sample identified by a data index in the data index sequence is determined. A scheme is generated for specifying a data movement based on the location. Responsive to determining that the location is a cache of a process, the data sample in the cache can be reused without having to load the data sample from a storage device.

20 Claims, 9 Drawing Sheets

(56) References Cited

OTHER PUBLICATIONS

Li, M., "Scaling Distributed Machine Learning with System and Algorithm Co-design", CMU-CS-17-102, School of Computer Science Carnegie Mellon University, Feb. 2017, 178 pages.

Shokri, R., et al., "Privacy-Preserving Deep Learning", CCS'15, Oct. 12-16, 2015, 12 pages.

Narayanamurthy, S.M., et al., "Method and System for Facilitating Distributed Storage for Synchronizing Sampler State between Computers", An IP.com Prior Art Database Technical Disclosure, IPCOM000211491D, Oct. 7, 2011, 6 pages.

Zhong, E., et al., "Method and System for Scaling Up Factorization Machines by Integrating Parameter Server with Map/Reduce Framework", An IP.com Prior Art Database Technical Disclosure, IPCOM000257106D, Jan. 15, 2019, 6 pages.

Disclosed Anonymously, "Method and System for Optimizing Deep Neural Networks Using Evolutionary Stochastic Gradient Descent (ESGD)", An IP.com Prior Art Database Technical Disclosure, IPCOM000255747D, Oct. 11, 2018, 3 pages.

Jia, Y., et al., "Caffe—Imagenet Tutorial", http://caffe.berkeleyvision.org/gathered/examples/imagenet.html, Accessed on Mar. 21, 2019, 5 pages.

Github, "ImageNet Database Build Scripts", https://github.com/avolkov1/keras_experiments/tree/master/examples/build_imagenet_data, Accessed on Mar. 21, 2019, 2 pages.

Kurth, T., et al., "Exascale Deep Learning for Climate Analytics", arXiv:1810.01993v1, Oct. 3, 2018, SC18, Nov. 11-16, 2018, 12 pages.

Zhu, Y., et al., "Entropy-Aware I/O Pipelining for Large-Scale Deep Learning", 2018 IEEE 26th International Symposium on Modeling, Analysis, and Simulation of Computer and Telecommunication Systems (MASCOTS), Sep. 25-28, 20018, 12 pages.

* cited by examiner

LOCALITY AWARE DATA LOADING FOR MACHINE LEARNING

BACKGROUND

The present application relates generally to computers and computer applications, and more particularly to machine learning and data loading for machine learning process.

Minibatch stochastic gradient descent (SGD) is used as an optimization method for approximating a solution of an objective function such as in machine learning algorithms. Minibatches are subsets of a dataset. Distributed implementations of minibatch SGD use multiple learners each with a local copy of the machine learning model. Per training step, learners load disjoint subsets of a minibatch from a storage system (i.e. the learners collectively load the size of the minibatch). In a training epoch composed by the steps, the whole dataset is loaded, and the training takes a number of training epochs for convergence. In such a scenario, the whole dataset is loaded multiple times during the training process.

BRIEF SUMMARY

A method, in one aspect, may include receiving a data index sequence indexing a dataset. The method may also include determining a location of a data sample identified by a data index in the data index sequence. The method may further include generating a scheme specifying a data movement based on the location. Responsive to determining that the location is a cache of a process executable on a processor, the data sample in the cache can be reused without having to reload the data sample from a storage device.

A system, in one aspect, may include a processor. The system may also include a memory coupled with the processor. The processor may be operable to at least execute a process. The processor may be further operable to allocate a cache associated with the process, the cache allocated in the memory. The processor may be further operable to receive a data index sequence indexing a dataset. The processor may be further operable to determine a location of a data sample identified by a data index in the data index sequence. The processor may be further operable to generate a scheme specifying a data movement based on the location, wherein responsive to determining that the location is the cache, the processor may generate the scheme such the scheme specifies for a reuse of the data sample in the cache without reloading the data sample from a storage device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
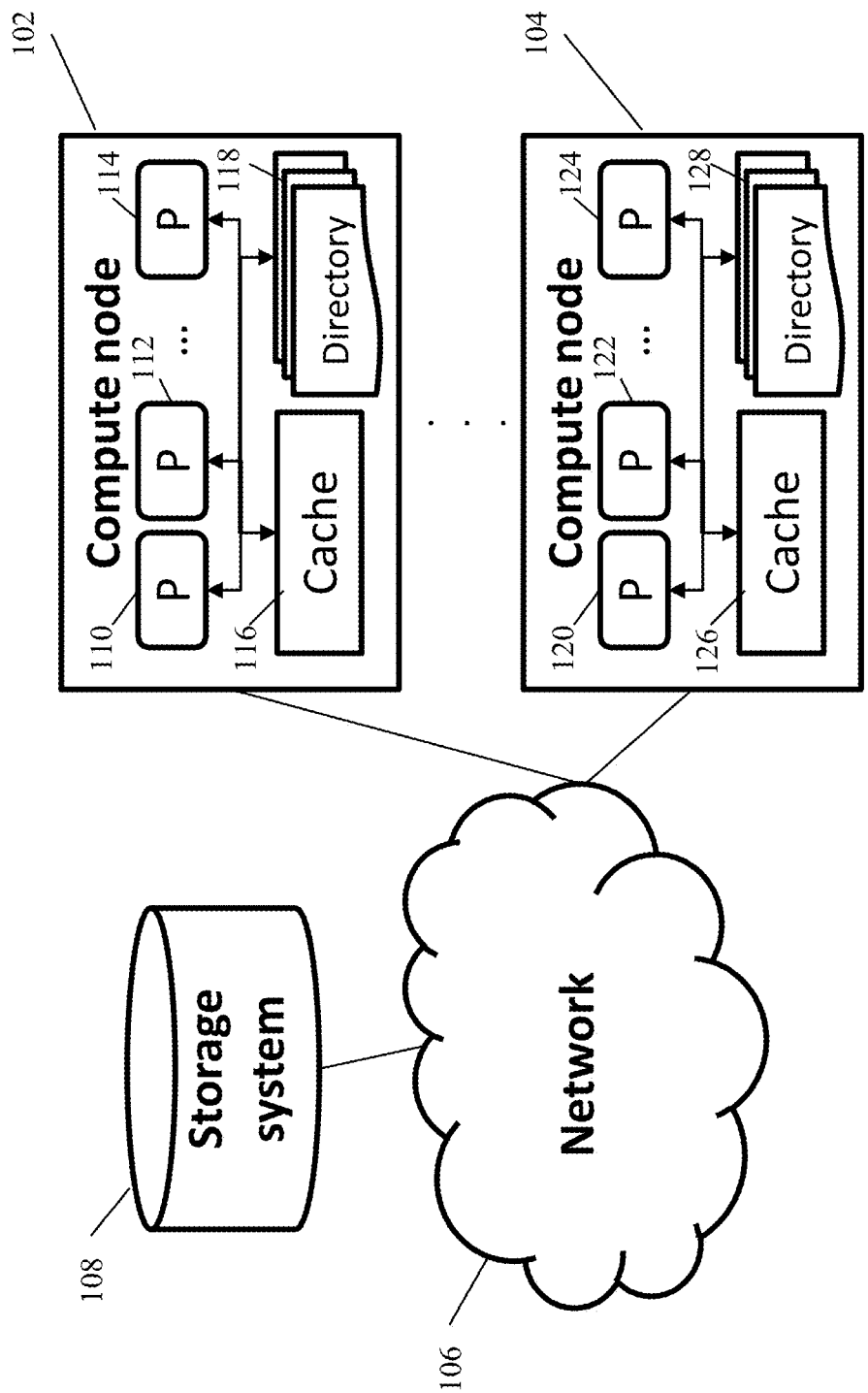
FIG. 1 is a diagram illustrating components of a system in one embodiment.

Gradient descent is a method used to a train machine learning model such as a neural network or deep learning model. Errors in model prediction on the training dataset is used to update the model (e.g., weights and bias) to reduce the errors. Minibatch refers to a subset of a dataset. Minibatch size can be selected, for example, by a user, and the entire training dataset can be divided into minibatches of the minibatch size. In the event the entire training dataset does not divide evenly, the remainder of the dataset can make up a smaller minibatch (smaller than the minibatch size). In minibatch stochastic gradient descent (SGD), parameter or weight updates to a machine learning model are performed once every minibatch.

As the computing power of large-scale systems keeps increasing, a machine learning model can be trained with larger and larger dataset using these systems. In a distributed minibatch stochastic gradient descent (SGD) implementation, for example, extra floating point operations per second (FLOPS) can be utilized by creating more distributed learners. A learner refers to a process loaded (or programmed to run) on a computer processor, which is (or for) executing a machine learning algorithm. An embodiment of a method in the present disclosure can scale the training performance, for instance, to correspond with the FLOPS improvement gained by increasing the number of learners, such that the requirement of loading the whole dataset per training epoch does not pose a bottleneck.

In various embodiments, a data loading system, method and technique may be provided for distributed minibatch SGD (also referred to as minibatch gradient descent), which minimizes accesses to the storage system and/or communication among distributed learners by exploiting cached content. For instance, a locality aware data loading for distributed minibatch stochastic gradient descent may be provided. A minibatch is a subset of a training data, e.g., resulting from the training data split into smaller batches. The ordering of samples in the minibatch sequence does not affect accuracy, and it is possible to minimize communication traffic by exploiting data locality with caching. Data loading to assemble minibatches may be done from a storage system or from caches of other learners, for instance, if (1) data is not present in an aggregated cache (cache of all compute nodes or processes involved in training) or if (2) data is to be re-distributed for creating balanced workload. If data is present in an aggregated cache, a minibatch can be assembled for use by one or more learners without any data loading—including loading from the storage system or exchanging among distributed learners. Samples may be re-distributed to balance the workload to optimize parallel computation performance.

In one aspect, a methodology in the present disclosure need not change the composition of minibatches to reduce communication. For instance, a method and/or system in some embodiments can assemble pre-defined minibatches without using different samples from the specified samples. In another aspect, a methodology in the present disclosure reduces accesses to the storage system, and may also reduce communication among compute nodes executing learners. Yet in another aspect, a methodology in the present disclosure provides an option to further reduce communication traffic incurred from data loading by tolerating imbalance of workload on each learner. For example, the option to tolerate imbalance reduces communication compared with traffic induced by requiring perfect workload balance.

FIG. 1 is a diagram illustrating components of a system in one embodiment. A system and/or method of the present disclosure in one embodiment can be implemented by a computer system, which includes distributed compute nodes 102, 104 connected to each other through a network 106. While the figure illustrates compute nodes 102 and 104, there can be any number of compute nodes participating in the distributed machine learning. Likewise, each compute node can have any number of learners or processes executing a machine learning algorithm (training a model).

A compute node 102, for example, can contain one or more sockets and a socket holds one processor (e.g., a CPU, a GPU, a FPGA), also referred to as a chip (a physical integrated circuit (IC)). A node may contain other hardware components and/or devices such as a memory and a network device. The socket refers to a physical connector on a computer motherboard that accepts a single physical chip. A processor can contain one or more cores, e.g., CPU cores. A processor or chip that contains multiple cores is referred to as a multi-core processor or chip, for instance, employing multi-core technology. As an example, a core can comprise a logical execution unit containing an L1 cache and functional units. Cores can independently execute programs, processes or threads.

In one embodiment, the compute nodes 102, 104 have an ability to simultaneously execute multiple processes, which are referred to as learners. For instance, a compute node can have one or more processes 110, 112, 114. A process 110, for example, executes a learner. Each of the compute nodes 102, 104 in the distributed system may execute one or plurality of learners in parallel. In one aspect, the one or more processes 110, 112, 114 may each run on a special processor such as a graphics processing unit (GPU), field programmable gate array (FPGA), or another processor.

In some embodiments, a storage system 108 is also connected to the network and it is used to store a dataset, which can be used to train a learner. In some embodiments, the storage system 108 may be distributed as well. A compute node 102 has a cache 116, which is used to store samples of the dataset and is accessible to learners 110, 112, 114 running on the same compute node 102. Other compute nodes in the system can be arranged in a similar manner. For instance, a compute node 104 has a cache 126, which can store samples of the dataset and is accessible to learners 120, 122, 124 running on the same compute node 104. An aggregated cache refers to the caches of all processes (learners) in all compute nodes 102, 104.

The "cache" (e.g., shown at 116, 126) refers to a software cache, a data structure for storing samples and managed by a program code, e.g., a learner code or an application running a learner. Such cache 116, 126 may be stored in a memory. The cache 116, 126 can be implemented in different ways. For example, it can be implemented using a memory buffer allocation. In another aspect, the cache 116, 126 can be implemented using an allocation from a high speed local storage. Yet in another aspect, a combination of memory buffer allocation local to a compute node and high speed local storage can be implemented. An example of a memory, which may store the cache 116, 126, may include a dynamic random-access memory (DRAM). For instance, another example of the memory, which may store the cache 116, 126, may include a high-speed solid state drive (SSD). Another type of memory can store the cache 116, 126. The cache 116, 126 may be stored in any one or combinations of such memory devices. In some embodiments, the size of the cache is allocated so that the cache is large enough to hold a subset of a dataset.

In one aspect, depending on the implementation of the cache 116, a directory 118 which records cache contents stored in the cache 116 and in caches of the other participating nodes may be implemented. For instance, if cache replacement is allowed, the directory 118 can be implemented to reflect the changes made to the aggregated cache, such that the view of the cache content is consistent among all learners 110, 112, 114. For instance, the directory in each node can have a "global" view of cache content. For example, a local directory tracks changes of cached content of every participating node in the distributed system. If the cache content is loaded in a specific way once without any replacement afterwards, it is possible to not have a directory but derive sample locations by computations. An example of a specific method of loading the cache content may include, but is not limited to, splitting a dataset among nodes, in a specified manner. For instance, consider there are two compute nodes participating in training; a dataset can be split in the middle, and the samples with indices smaller than the middle index can be cached in node 1 and the rest of the samples can be cached in node 2. With multiple nodes, the dataset can be split by the number of nodes. In such an example, a directory is not needed, as it can be known the locations of the samples in the dataset. Similarly, another compute node 104 in the system may implement a directory 128, depending on the implementation of the cache 126. In one aspect, such a directory may be stored in a memory of a compute node. In another aspect, such a directory may be received, for example, from another compute node, or another computer. The directory 118, 128 can also be distributed among nodes. In this case, the size of directory in each node can be smaller, and a lookup operation may need to access multiple nodes.

A compute node's cache is populated with data, for example, for training. For example, a cache 116 of a compute node 102 stores a subset of the dataset. In one aspect, the cache 116 of the compute node 102 can be shared by all learners or processes (or processors executing the processes) on that compute node 102. As an example, the dataset store on a storage system 108 can be split into partitions, and each of the compute nodes 102, 104 can be allowed to load a partition. The partitions can be disjoint partitions. The size of the partitions (e.g., disjoint partitions) can be equal or they may vary. As a result, the compute nodes 102, 104 collectively cache the whole dataset. Base on a consistent view of cache content, multiple shuffled mini-batch sequences of an epoch can be processed.

Figure 2:
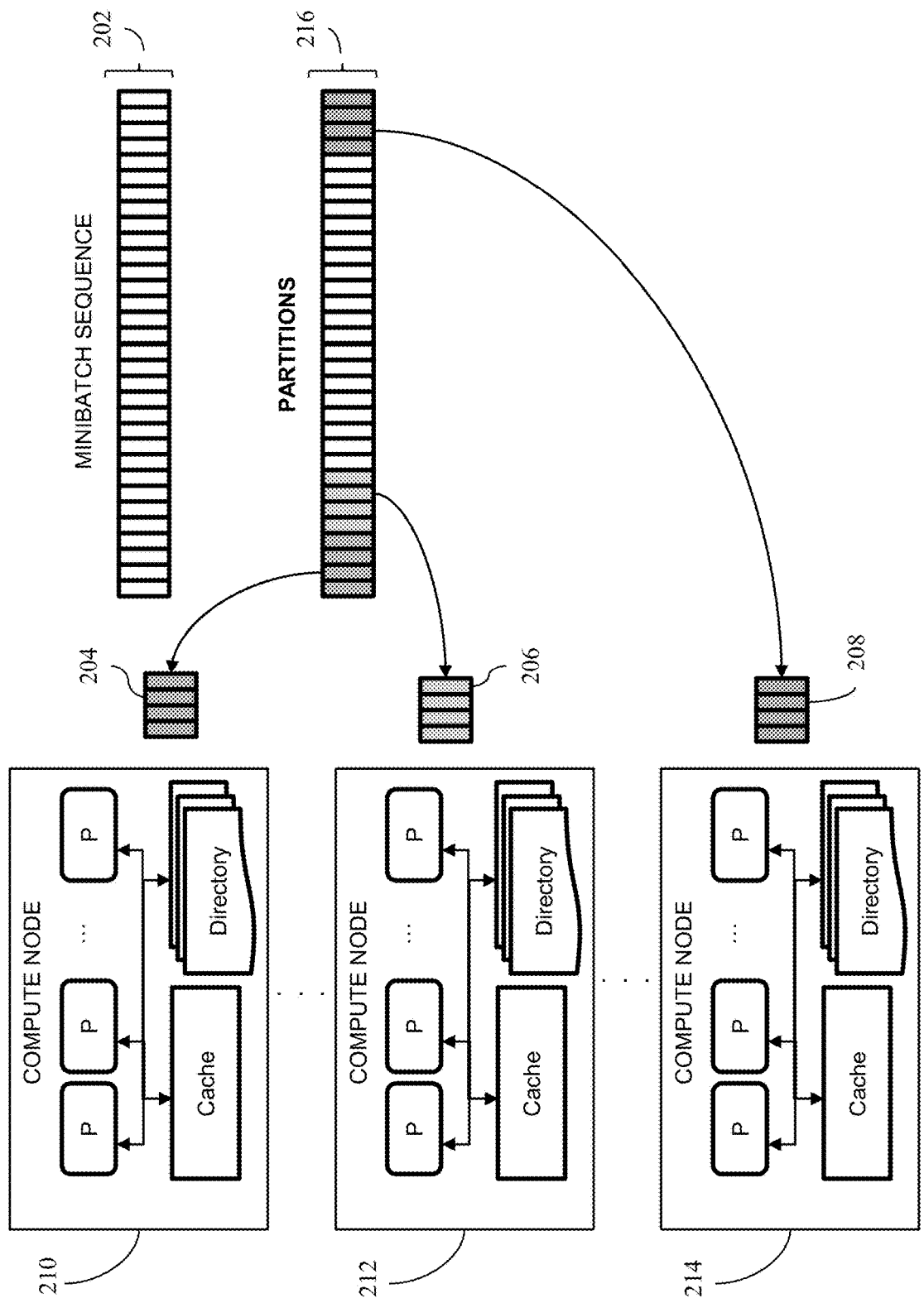
FIG. 2 illustrates an example of partitioned minibatch sequence in one embodiment.

FIG. 2 illustrates an example of partitioned minibatch sequence in one embodiment. A predefined minibatch sequence is generated. For example, a shuffled minibatch sequence 202 is generated for all learners. In creating new minibatches, the actual data samples need not be shuffled; Instead, in some embodiments, the indices of data samples are shuffled, for instance, since it is faster to shuffle the indices than the actual data. A "minibatch sequence" refers to a list of data sample indices that represents a minibatch. In a distributed system, learner processes collectively train with a minibatch in a step. Each learner may acquire the same "minibatch sequence", and take a slice (or subset), for example, a disjoint slice (or subset), from a minibatch sequence as its local batch. For example, at the beginning of an epoch, the same seed is used by all distributed learners to create a random permutation of the sample indices (a minibatch sequence), which can be subsequently divided into multiple slices (or subsets), for example, shown at 204. Multiple minibatch slices, for example, are shown at 216. 204, 206, and 208. The data samples corresponding to the minibatch slices can be acquired by a data loading procedure in different nodes. For instance, a compute node 210 may load a minibatch slice 204; a compute node 212 may load a minibatch slice 206; and compute node 214 may load a minibatch slice 208; and so forth. In some embodiments of a system and/or method in the present disclosure, the minibatch slices or subsets need not be predetermined for compute nodes. A compute node can determine what data of the minibatch sequence the compute node should load based on determining the locations of the data samples of the minibatch sequence (also referred to as sample distribution or workload distribution) across the caches of the compute nodes participating in the distributed minibatch training. The minibatch slice or subset a compute node loads need not be sequential. A compute node may follow a protocol to coordinate with another or other compute nodes, which subset of the minibatch, the compute node is assembling to load, for instance, such that each of the compute nodes in the distributed minibatch training can have a disjoint or non-overlapping subset of the minibatch.

In performing a training step involving a minibatch sequence 202, the learners (also referred to as learner processes) collectively assemble a minibatch from cached content. For example, each learner assembles data samples as its minibatch subset, from the cached content for those that are cached, and from a storage device or system for those that are not cached already. For instance, responsive to acquiring a predefined sequence of minibatch indices of a future epoch, the learners determine the minibatch workload distribution (sample counts in individual caches), for example, by querying a directory of all cache content.

Figure 3:
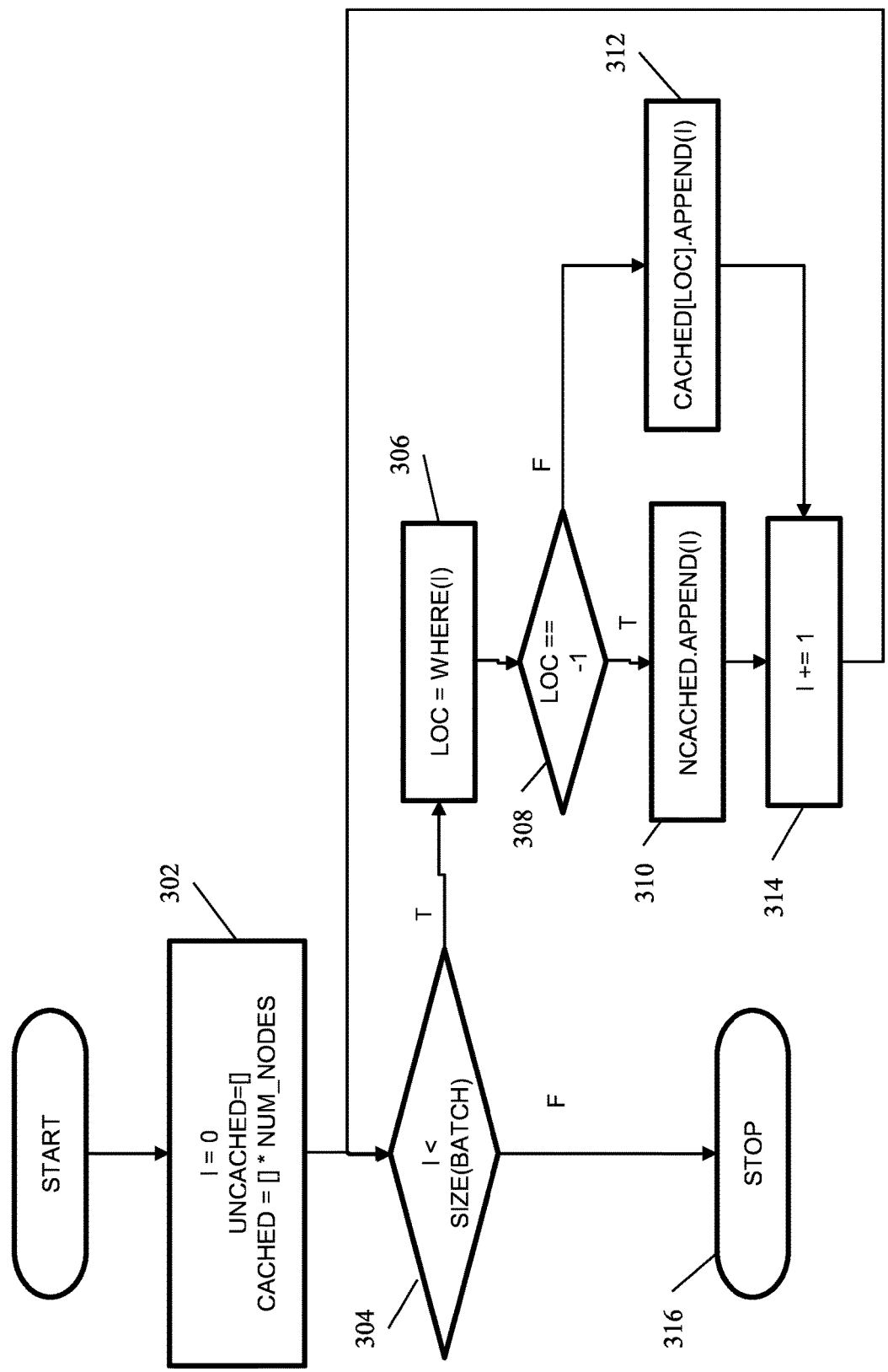
FIG. 3 is a flow diagram illustrating a learner determining a workload distribution in one embodiment.

In some embodiments, the learners determine the data sample locations of the minibatch by querying the directory. For example, based on the pre-defined minibatch sequence, a learner looks up the directory to determine the workload distribution of the cached subset of current minibatch and also the data samples that are not cached. An embodiment of determining locations of where data samples are cached is shown in FIG. 3. In some embodiments, the workload distribution can be imbalanced. For instance, the number of data samples stored in a compute node that belongs to the current minibatch can vary from that of another compute node. That is, compute nodes can cache partial minibatches of different size.

Given the information about the workload distribution of the cached subset of the current minibatch, the learners establish a scheme for the data sample to be removed from the aggregated cache, loaded from the storage system, and/or exchanged among compute nodes to assemble the minibatch, e.g., such that all data of the minibatch is loaded collectively in the compute nodes for a training step. Based on the scheme, a minibatch is assembled for training. In some embodiments, data movements are performed if load-balancing is desired. The established scheme can reduce the number of accesses to a storage system in loading a dataset, for example, the whole dataset for an epoch of training. For instance, the total data volume of data loading in one epoch is reduced from the whole dataset to the data missing from the aggregated cache plus data movements, if any, performed to balance workload of minibatches.

Figure 4:
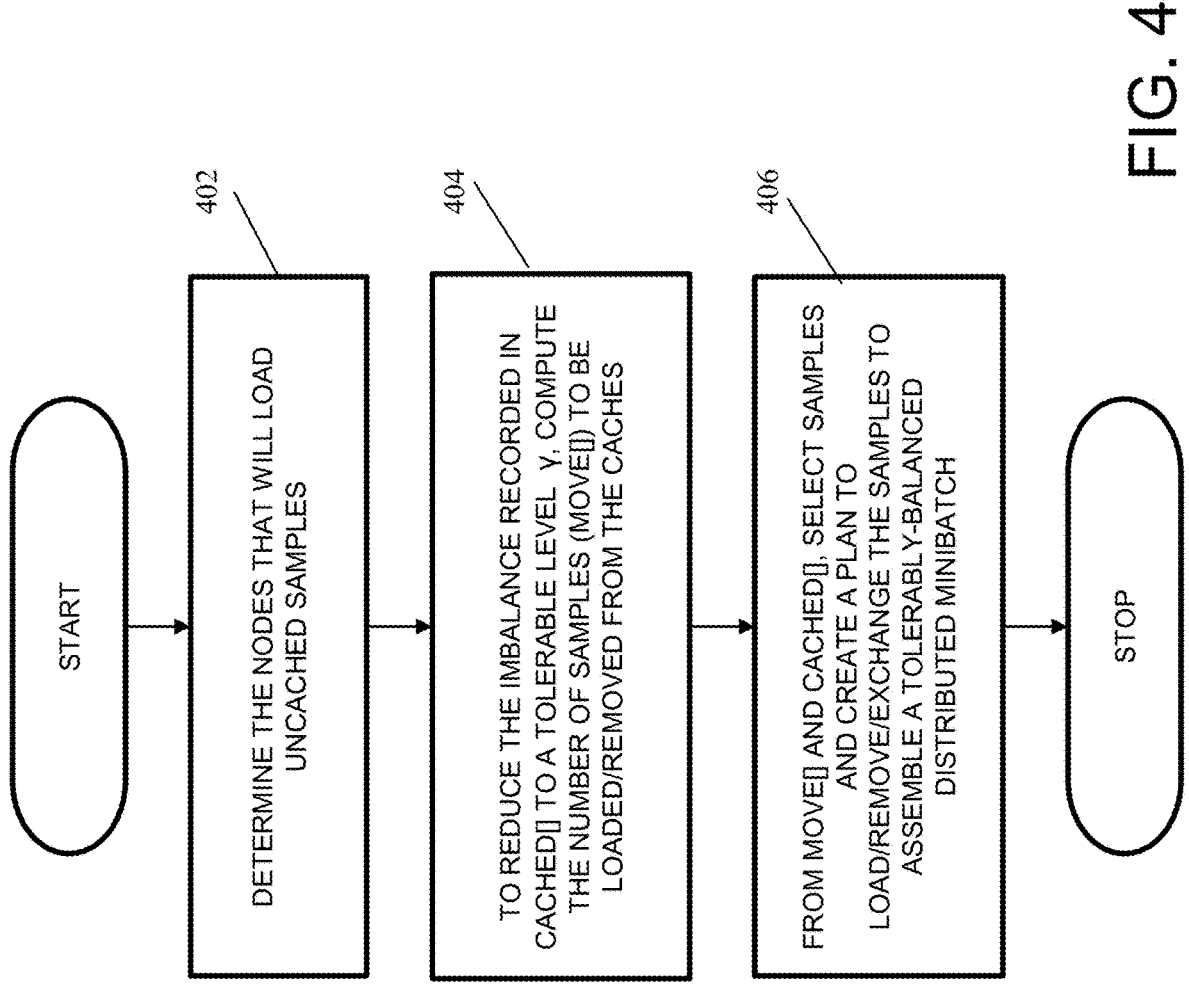
FIG. 4 is a flow diagram illustrating a method of establishing a scheme of data movement in one embodiment.

Allocating a cache to hold distinct data samples, determining the minibatch workload distribution, and establishing a scheme to assemble a minibatch are repeated until all the minibatch sequences making up an epoch of training dataset are processed. An embodiment of this iteration procedure is shown in FIG. 4.

Figure 5:
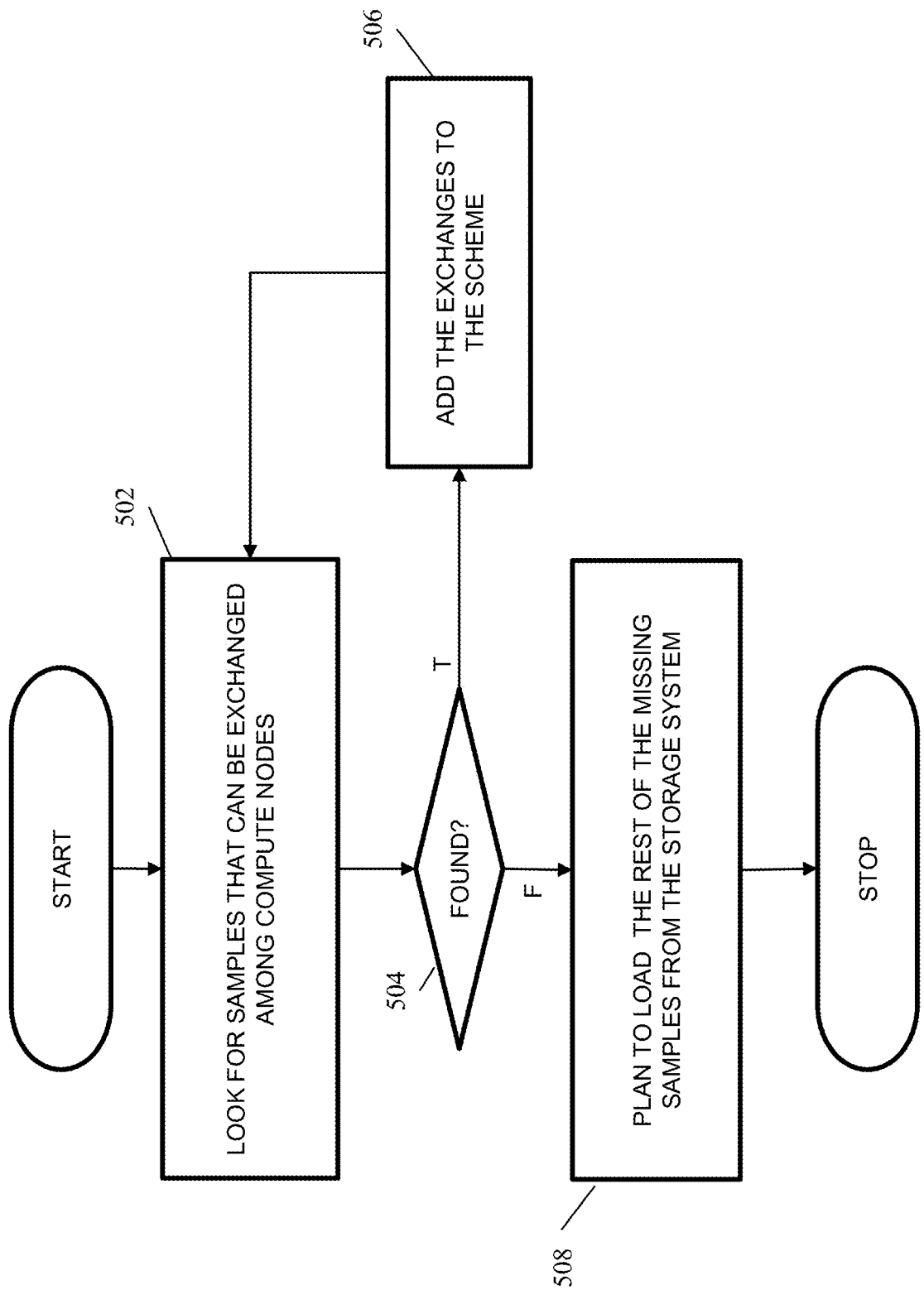
FIG. 5 is a flow diagram illustrating a method that minimizes accesses to a storage system in one embodiment.

The data loading scheme created based on workload distribution describes the samples that are to be loaded from the storage system, if any. The data loading scheme may also describe data to be exchanged among compute nodes if found in the aggregated cache. It is possible to use different policies for determining the scheme depending on different optimization goals. An embodiment of minimizing storage accesses is shown in FIG. 5.

FIG. 3 is a flow diagram illustrating a learner determining a workload distribution in one embodiment. A learner process can determine a location or locations of samples via a method shown in FIG. 3 in one embodiment. Every learner can invoke the method, and the method can be invoked independently by a learner. In one aspect, a learner individually computes the same solution. In another aspect, all learners can collaboratively compute the same solution. Input to the method may include a minibatch sequence and a directory of all cache content. An example of the directory can be a lookup table, for example, a dictionary data structure storing a (key, value) pair. Such a directory can be looked up with a key as an input and receive a value associated with the key as an output. The directory contains indices of data samples and the locations of those data samples. For example, looking up the directory with input of specifying data sample index 456, the directory returns a value of 2, indicating that data sample 456 is found to be cached in compute node 2. The directory may return a null value (or another designated value), if the specified or input index is not found in the directory, indicating that the data sample is not in the aggregated cache. The directory can be built when all the caches are populated. For example, initially in processing the first epoch the caches are empty, and the learners collectively load the whole dataset in the first epoch, each learner caching what that learner loads. The directory is updated for every sample loaded into the cache. As another example, there can be a phase where the caches are populated with the data samples from the dataset in a specific way. For instance, consider that there are 2 compute nodes with compute node 1 caching the first half of the dataset, and compute node 2 caching the second half of the dataset. In this example case, a directory is not needed, as a learner process is able to compute where a data sample is currently located by checking the data sample's index against 0.5×(dataset size) to find out which node this data sample is located. The method shown in FIG. 3 outputs uncached data information, e.g., a list of sample indices not in the aggregated cache, if applicable. The method also outputs cached data information, e.g., a list or lists of samples cached in local caches of nodes.

At 302, data structure or variables used in the method are initialized. For example, a variable index, I, is set to 0; uncached array is set to an empty set; and cached array is set to an empty set. The uncached array data structure holds uncached data indices. The cached array data structure holds cached data (e.g., an index of cached data). The cached array data structure may be a multi-dimensional array (e.g., 2 dimensional, where one dimension represents a compute node location, and another dimension represents minibatch data index. The processing at 304-314 is performed for all indices in a minibatch sequence.

At 304, it is determined if I is less than the minibatch size. The minibatch size is the size of the minibatch sequence, e.g., the number of training data in the minibatch. If I is not less than the minibatch size, all indices have been processed, and therefore, the method can stop at 316 or return back to its caller.

Otherwise, at 306, a location where minibatch sample data associated with index I is stored is determined, for example, by looking up a directory of cached content. For example, a function "where(I)" may be invoked. Such a function returns the cache identifier or identification (ID) where the sample data associated with index I is cached, if that data is cached. Otherwise, such a function (e.g., "where (I)") returns −1 or another designated value to signal that the sample data is not cached.

At 308, if the sample data is not cached, at 310 the value of I is added or appended to the data structure holding the uncached data. For example, uncached array data structure is updated to include I.

At 312, if the sample data is cached, cached array data structure is updated to hold the index of the cached data, e.g., I. For instance, the location dimension of the cached array is updated to include I, e.g., cached [loc] is updated to hold I. At 314, I is incremented and the processing returns to 304 for another iteration, e.g., until all minibatch indices have been processed.

FIG. 4 is a flow diagram illustrating a method of establishing a scheme of data movement in one embodiment. Input to the method includes minibatch sequence, a directory of all cached content, uncached data information (e.g., a list of data sample indices not in the aggregated cache), cached data information (e.g., a list or lists of the data samples cached in nodes' local caches), and a load balance tolerance criterion $\gamma$ (gamma). The load balance tolerance criterion can be predefined or configured. The method outputs a scheme of data sample movements. At 402, the nodes that will load uncached data samples are determined and a scheme for loading them from the storage system to compute nodes is also created.

Figure 6:
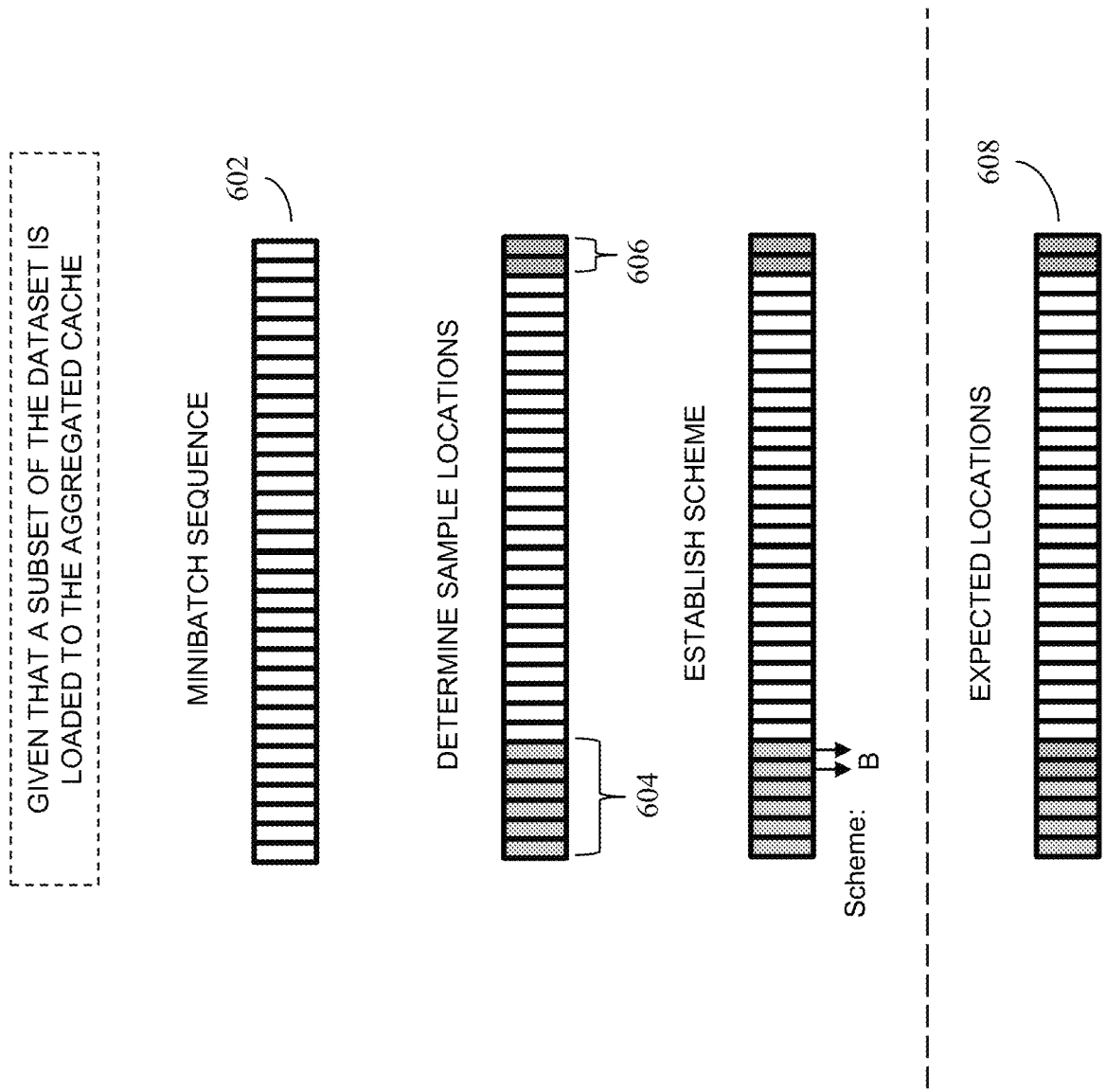
FIG. 6 illustrates a simple example of balancing load of data sample among compute nodes in one embodiment.

At 404, to reduce the imbalance recorded in cached[ ] to a tolerable level $\gamma$, the number of samples ("move[ ]" data structure) to be loaded or removed from the caches is computed. A simple example of balancing is shown in FIG. 6. Consider a minibatch sequence as shown at 602. Consider also that a compute node A holds 6 data samples associated with indices 604 in its cache and compute node B holds 2 data samples associated with indices 606 in its cache. A scheme to balance the cached content between compute node A and compute node B may include moving 2 data samples from compute node A to compute node B. In this way, both compute nodes can hold 4 data samples each, for instance, shown at 608. As another example of load balancing may include the following: consider that compute node A holds 5 data samples, compute node B holds 25 data samples, and compute node C holds no sample. A load balancing scheme may specify that 5 data samples from compute node B be moved to compute node A, and another 10 data sample from compute node B to be moved to compute node C.

At 406, based on the data samples computed to be loaded and/or removed (e.g., stored in "move[ ]" data structure) and cached data samples (array cached[ ]), data samples are selected and a scheme is created to load, remove, and/or exchange the samples, to assemble a minibatch that meets a tolerably-balanced distribution specified by the load balance tolerance criterion.

FIG. 5 is a flow diagram illustrating a method that creates a scheme which minimizes accesses to a storage system in one embodiment. The method can be invoked by a learner process. Input to the method includes cached data information (e.g., cached[ ] and uncached[ ] arrays shown in FIG. 3) and a list of index number of data samples to be loaded and/or removed from a compute node (e.g., a data structure storing such a list, e.g., "move[ ]" generated by a method shown in FIG. 4). The method outputs a scheme of sample movements. The scheme that is output minimizes storage system input/output (I/O) operations since in one embodiment the scheme balances the workload distribution by exchanging cached samples among nodes and only loads from the storage system the data samples that are not present in the aggregated cache. At 502, the method includes looking for data samples that can be exchanged among compute nodes. At 504, it is determined whether a data sample that can be exchanged is found. If a data sample is found, at 506, the exchanges are added to the scheme. If no data sample for exchange can be found, at 508, the scheme is updated to specify that the rest of the missing data samples in uncached[ ] array are to be loaded from the storage system.

A system and/or method in some embodiments creates a data loading scheme for distributed minibatch SGD, which can minimize both accesses to a storage system and communication traffic. The system and/or method in some embodiments utilizes cached content to reduce accesses to the storage system. For instance, content in aggregated cache is reused to assemble minibatches where the ordering of data samples reduces data transfers while maintaining equivalent algorithmic and convergence behavior. The system and/or method in some embodiments determines cached data samples and workload distribution for creating the data loading scheme that minimizes communication. The system and/or method in some embodiments can further reduce communication traffic incurred from data loading by tolerating imbalance of workload on each machine learning process or learner. The system and/or method in some embodiments loads data according to the scheme.

Figure 7:
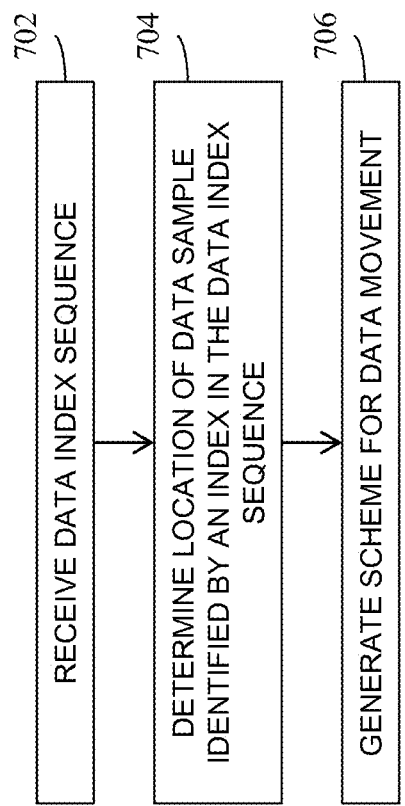
FIG. 7 is a flow diagram illustrating a method of locality aware data loading in one embodiment.

FIG. 7 is a flow diagram illustrating a method of creating a scheme for data loading in one embodiment. Data can be loaded according to the scheme. The method may be performed by one or more hardware processor, for example, coupled with a memory device. At 702, a data index sequence is received or obtained, which indexes a dataset. In one embodiment, the data index sequence is a minibatch index sequence, also referred to above as "minibatch sequence". In one embodiment, the minibatch index sequence is a shuffled minibatch index sequence. The minibatch index sequence includes indices or index numbers, each index or index number identifying a sample data (e.g., feature data) of a minibatch used as training data in machine learning. Generally a minibatch is a subset of a training dataset used for a step in an epoch of training. For instance, consider that a training dataset contains 1.28 million data samples. The training dataset can be partitioned into 40 minibatches each containing 32,000 (32K) data samples. In a distributed computing, there may be multiple processes performing the training (e.g., multiple learner), which may be distributed among multiple processors or compute nodes. In that scenario, all of the multiple processes collectively load 32K data samples, and each of the multiple processes can perform training with its respective subset of 32K data samples. Parameters (e.g., weights, bias) and/or gradients thereof computed by each of the multiple processes can be combined for updating the parameters in a step of training.

At 704, a location of a data sample of the data index sequence, e.g., the minibatch index sequence is determined. For instance, a processor or a compute node caching a data sample, which is identified by an index of the minibatch index sequence, is determined. For example, the locations of all data samples of the minibatch index sequence can be determined collectively by all distributed learners participating in the step of training. In one aspect, a learner process determines locations for at least its subset of the minibatch index sequence. In another aspect, a learner process can determine a location for each index in the minibatch index sequence. In one embodiment, a cache directory may be queried to discover an index identifying a minibatch data sample already in the cache of at least one processor or compute node. For instance, a method described herein with reference to FIG. 3 may be executed to determine the location or locations of sample data.

At 706, a scheme is established for data movement. The data movement scheme can minimize access to a storage system. Responsive to determining that the location determined at 704 is a cache of a learner process, running or executable on a processor or compute node, reuse of that data sample in the cache is allowed, for example, without reloading the data sample from a storage system or device. In one aspect, the data movement scheme includes a scheme to load sample data if (e.g., only if) the sample data is not found in the caches of the learner processes running or executable on compute nodes or processors participating in training using the minibatch data samples. A data sample may be moved from one process' or compute node's cache to another process' or compute node's cache, for instance, optionally. In one aspect, considering whether to move a data sample between process' or compute nodes' caches may consider whether loading data directly from a storage system or device is more or less costly (e.g., in terms of computing resources such as speed, power usage, and/or others) than exchanging or moving data between processes' or compute nodes' caches. Such cost determination may influence a decision as to whether to load data from a storage system (or device) or from another process' or compute node's cache. In some embodiments, the size of a minibatch subset a learner process is to assemble can depend on the number of learner processes. The size may also depend on a load balance tolerance level or criterion, if specified.

Based on the scheme, a subset of the minibatch data samples can be assembled for a learner (e.g., a process to perform machine learning based on the subset as training data). Assembling, for instance, includes a processor or a compute node or the process of the compute node loading the needed data (e.g., those missing from its cache or aggregate cache) from a storage device or from another compute node. In one embodiment, a processor or compute node performing a machine learning may load a subset of the minibatch on which to train a machine learning model.

Figure 8:
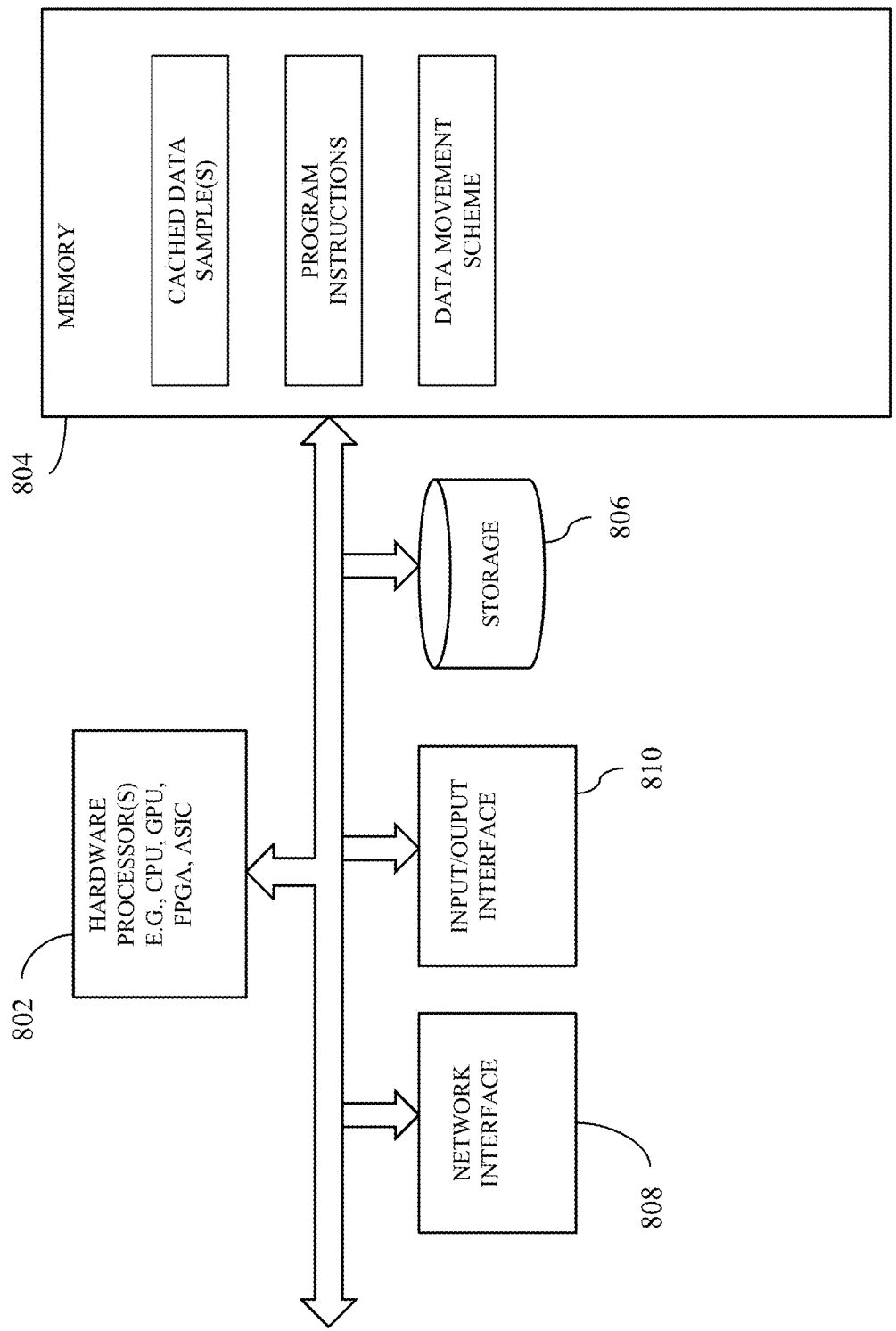
FIG. 8 is a diagram showing components of a system in one embodiment that can perform locality aware data loading.

FIG. 8 is a diagram showing components of a system in one embodiment that can perform locality aware data loading, for example, for distributed minibatch gradient descent (e.g., minibatch stochastic gradient descent) in machine learning. One or more hardware processors 802 such as a central processing unit (CPU), a graphic process unit (GPU), and/or a Field Programmable Gate Array (FPGA), an application specific integrated circuit (ASIC), and/or another processor, may be coupled with a memory device 804, and generate a scheme to perform, or perform, locality aware data loading. A memory device 804 may include random access memory (RAM), read-only memory (ROM) or another memory device, and may store data and/or processor instructions for implementing various functionalities associated with the methods and/or systems described herein. A memory device 804 may also include a learner process' cache on which data samples of a minibatch may be stored. One or more processors 802 may execute computer instructions stored in memory 804 or received from another computer device or medium. A memory device 804 may, for example, store instructions and/or data for functioning of one or more hardware processors 802, and may include an operating system and other program of instructions and/or data. One or more hardware processors 802 may receive input such as a minibatch sequence. A learner process running or executable on at least one of the hardware processors 802 can generate the minibatch sequence, or acquire the minibatch sequence from another process. A learner process obtains or receives the same minibatch sequence as another learner process implementing a distributed minibatch SGD. For instance, the distributed learner processes obtain the same minibatch sequence in the same step. At least one hardware processor 802 may generate a scheme of data movement, for performing locality aware data loading. In one aspect, minibatch data samples may be stored on a storage device 806 or received via a network interface 808 from a remote device, and may be loaded into a memory device 804 for training a machine learning model. The generated scheme may be stored on a storage device 806, and may be temporarily loaded into a memory device 804, for performing a data movement according to the scheme. In another embodiment, the generated scheme may be stored in memory 804 entirely. One or more hardware processors 802 may be coupled with interface devices such as a network interface 808 for communicating with remote systems, for example, via a network, and an input/output interface 810 for communicating with input and/or output devices such as a keyboard, mouse, display, and/or others.

A methodology of the present disclosure need not require that all learners (or processes executing machine learning or training) collectively load all the minibatch data samples from a storage system, for instance, if the aggregated cache holds a subset of the training dataset. While reducing accesses to the storage system, a methodology of the present disclosure may also use data locality in the caches of the processes or compute nodes running the processes to minimize communication traffic (for the exchanges among compute nodes). A methodology of the present disclosure can assemble pre-defined minibatches without using different data samples from a specified training dataset. For instance, a methodology of the present disclosure need not modify data, for example, in a pre-processing step, as modifying data may cause loss of information and pre-processing may incur cost and result in format which is not generic. The samples composing the minibatch need not be modified (the data samples are not different from pre-determined data samples). For example, given a pre-determined minibatch sequence (5, 6, 7, 8), a methodology of the present disclosure may assemble a minibatch sequence (7, 6, 5, 8) or (8, 7, 6, 5) or any other permutation of the same sequence, since the order of the samples does not matter in SGD. In some embodiments, a methodology of the present disclosure uses a predefined shuffle sequence, equivalent in all learners. A methodology of the present disclosure can utilize data locality to reduce data movement. For example, the data can be loaded from the aggregated cache instead of from the storage system, and thus, data movement can be reduced. A methodology of the present disclosure may optionally move data to balance the workload, which can reduce computation time of the learner processes.

A methodology of the present disclosure can use user defined minibatch sequence. A methodology of the present disclosure can reduce accesses to the storage system and total data movement volume among compute nodes. A methodology of the present disclosure can tolerate a load imbalance to a degree on systems having network overhead. A methodology of the present disclosure can allow for caching a subset of an entire or whole dataset, applying data movement volume reduction to the cached subset. A training batch sequence can be formed from cached content and data samples loaded from a storage system or device for missing data (from cache). Optionally, the training batch sequence can be formed with balanced data samples among the compute nodes. A methodology of the present disclosure can be implemented for, or applied to, a different machine learning optimization method, for example, other than the minibatch SGD.

Figure 9:
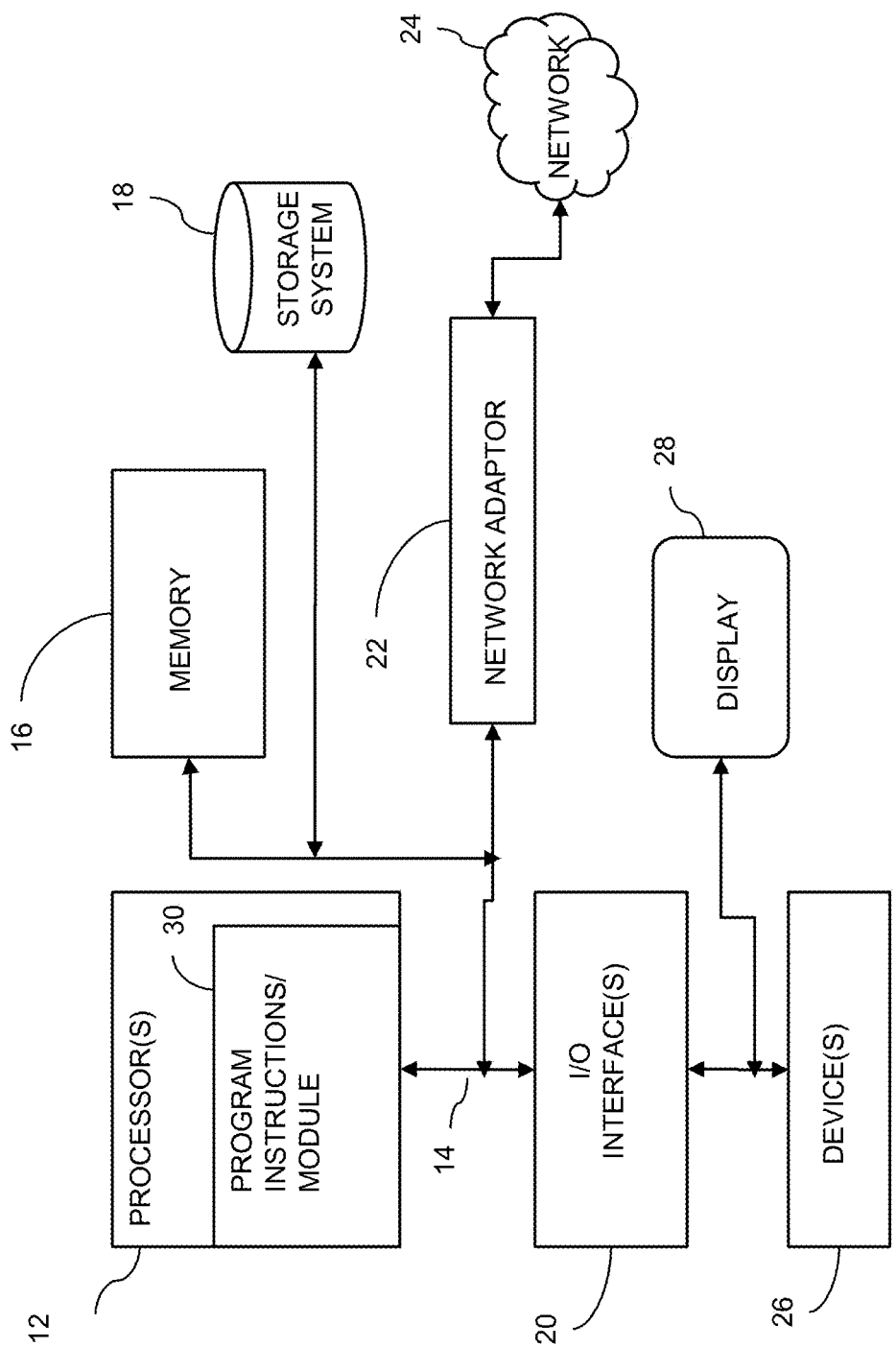
FIG. 9 illustrates a schematic of an example computer or processing system that may implement a locality aware data loading system in one embodiment.

FIG. 9 illustrates a schematic of an example computer or processing system that may implement a locality aware data loading system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving a data index sequence indexing a dataset;
determining a location of a data sample identified by a data index in the data index sequence;
generating a scheme specifying a data movement based on the location, wherein responsive to determining that the location is a cache of a process executable on a processor, allowing for a reuse of the data sample in the cache without reloading the data sample from a storage device.

2. The method of claim 1, wherein the data index sequence is a minibatch index sequence and the dataset is a minibatch on which a training is performed in machine learning.

3. The method of claim 2, further comprising assembling the minibatch, wherein the process loads at least some of the minibatch based on the scheme.

4. The method of claim 2, wherein the data movement specifies to move at least some of the minibatch between the cache and another process' cache.

5. The method of claim 2, wherein the determining a location comprises determining locations of all of the minibatch, and the scheme specifies data movements associated with at least some of the minibatch.

6. The method of claim 1, wherein responsive to determining that the data sample is not located in the cache, the data movement specifying to load the data sample from the storage device.

7. The method of claim 1, wherein responsive to determining that the location is another cache of another process, the data movement specifying to load the data sample from said another process' cache.

8. A computer program product comprising a computer readable storage medium having program instructions embodied therewith, the program instructions executable by a device to cause the device to:
receive a data index sequence indexing a dataset;
determine a location of a data sample identified by a data index in the data index sequence;
generate a scheme specifying a data movement based on the location, wherein responsive to determining that the location is a cache of a process executable on a processor, allowing for a reuse of the data sample in the cache without reloading the data sample from a storage device.

9. The computer program product of claim 8, wherein the data index sequence is a minibatch index sequence and the dataset is a minibatch on which a training is performed in machine learning.

10. The computer program product of claim 9, wherein the device is further caused to assemble the minibatch, wherein the process loads at least some of the minibatch.

11. The computer program product of claim 9, wherein the data movement specifies to move at least some of the minibatch between the and another process' cache.

12. The computer program product of claim 8, wherein responsive to determining that the data sample is not located in the cache, the data movement specifying to load the data sample from the storage device.

13. The computer program product of claim 8, wherein responsive to determining that the location is another process' cache, the data movement specifying to load the data sample from said another process' cache.

14. A system comprising:
a processor;
a memory coupled with the processor;
the processor operable to at least:
execute a process;
allocate a cache associated with the process, the cache allocated on the memory;
receive a data index sequence indexing a dataset;
determine a location of a data sample identified by a data index in the data index sequence;
generate a scheme specifying a data movement based on the location, wherein responsive to determining that the location is the cache, the processor generates the scheme allowing for a reuse of the data sample in the cache without reloading the data sample from a storage device.

15. The system of claim 14, wherein the data index sequence is a minibatch index sequence and the dataset is a minibatch on which a training is performed in machine learning.

16. The system of claim 15, wherein the processor is further operable to assemble the minibatch, wherein the processor loads at least some of the minibatch.

17. The system of claim 15, wherein the data movement specifies to move at least some of the minibatch between the cache and another process' cache.

18. The system of claim 15, wherein the processor generates the minibatch index sequence.

19. The system of claim 14, wherein responsive to determining that the data sample is not located in the cache, the data movement specifying to load the data sample from the storage device.

20. The system of claim 14, wherein responsive to determining that the location is another process' cache, the data movement specifying to load the data sample from said another process' cache.

* * * * *